US008322861B2

(12) United States Patent
Tsai et al.

(10) Patent No.: US 8,322,861 B2
(45) Date of Patent: Dec. 4, 2012

(54) LAMP SOURCE MODULE AND PROJECTION SYSTEM

(75) Inventors: Te-Ying Tsai, Hsinchu County (TW); Shang-Hsuang Wu, Hsinchu County (TW); Chih-Cheng Chou, Hsinchu County (TW); Yi-Kuan Liao, Hsinchu County (TW)

(73) Assignee: Young Green Energy Co., Hsinchu County (TW)

( * ) Notice: Subject to any disclaimer, the term of this patent is extended or adjusted under 35 U.S.C. 154(b) by 247 days.

(21) Appl. No.: 12/795,660

(22) Filed: Jun. 8, 2010

(65) Prior Publication Data

US 2011/0032491 A1 Feb. 10, 2011

(30) Foreign Application Priority Data

Aug. 7, 2009 (CN) .......................... 2009 1 0166001

(51) Int. Cl.
*G03B 21/18* (2006.01)
(52) U.S. Cl. ................ 353/57; 353/52; 353/58; 353/60; 353/61; 362/264; 362/294
(58) Field of Classification Search .................... 353/30, 353/34, 37, 52–61, 69, 70, 72, 82, 83, 94, 353/98, 99, 102, 119, 122; 348/744, 745, 348/750, E9.025, E9.027; 345/1.3, 629, 345/589, 631; 313/25, 36, 44, 46; 362/264, 362/294, 345, 373; 349/5, 7, 8, 9
See application file for complete search history.

(56) References Cited

U.S. PATENT DOCUMENTS

| 5,860,719 | A | * | 1/1999 | Suzuki et al. | .................... 353/61 |
| 6,523,960 | B2 | | 2/2003 | Watanabe | |
| 6,709,112 | B2 | | 3/2004 | Miyamoto et al. | |
| 7,029,123 | B2 | * | 4/2006 | Gishi et al. | ...................... 353/57 |
| 7,237,906 | B2 | | 7/2007 | Morimoto et al. | |
| 7,367,679 | B2 | * | 5/2008 | Emery | ............................ 353/60 |

(Continued)

FOREIGN PATENT DOCUMENTS

CN  101216162  7/2008

OTHER PUBLICATIONS

"Office Action of China Counterpart Application" with English translation thereof, issued on Dec. 23, 2011, p. 1-p. 9.

*Primary Examiner* — Georgia Y Epps
*Assistant Examiner* — Sultan Chowdhury
(74) *Attorney, Agent, or Firm* — Jianq Chyun IP Office

(57) ABSTRACT

A lamp source module includes a holder having an air inlet and an air outlet, a gas discharge lamp having a lamp reflector assembled onto the holder and a burner disposed in the lamp reflector, a light cover assembled on the holder and surrounding the lamp reflector, a blower duct communicating with the air inlet and extending along the exterior of the lamp reflector to the bottom of the lamp reflector, and an airflow generator communicating with the blower duct and capable of providing a cooling airflow. The air inlet is capable of causing the cooling airflow to enter the blower duct. The blower duct is capable of directing the cooling airflow to the bottom of the lamp reflector to make the cooling airflow pass through a sandwiched space surrounded by the lamp reflector and the light cover and then discharge from the air outlet.

20 Claims, 4 Drawing Sheets

U.S. PATENT DOCUMENTS

| | | | |
|---|---|---|---|
| 7,425,793 B2 * | 9/2008 | Haga et al. | 313/46 |
| 7,510,285 B2 | 3/2009 | Takemi et al. | |
| 2003/0179579 A1 * | 9/2003 | Hsu et al. | 362/294 |
| 2004/0246447 A1 * | 12/2004 | Shiraishi | 353/58 |
| 2004/0263799 A1 * | 12/2004 | Lim | 353/61 |
| 2005/0162618 A1 * | 7/2005 | Morita et al. | 353/57 |
| 2006/0152684 A1 * | 7/2006 | Lin et al. | 353/58 |
| 2006/0209544 A1 | 9/2006 | Nishikawa et al. | |
| 2006/0256296 A1 * | 11/2006 | Yun et al. | 353/55 |
| 2007/0216874 A1 | 9/2007 | Suzuki | |
| 2007/0296929 A1 * | 12/2007 | Okubo et al. | 353/61 |
| 2008/0100807 A1 | 5/2008 | Fujii et al. | |
| 2008/0291401 A1 * | 11/2008 | Lo et al. | 353/58 |

* cited by examiner

… (1)

LAMP SOURCE MODULE AND PROJECTION SYSTEM

CROSS-REFERENCE TO RELATED APPLICATION

This application claims the priority benefit of China application serial no. 200910166001.2, filed on Aug. 7, 2009. The entirety of the above-mentioned patent application is hereby incorporated by reference herein and made a part of this specification.

BACKGROUND OF THE INVENTION

1. Field of the Invention

The invention relates to a lamp source module and more particularly, to a lamp source module adapted to a projection system.

2. Description of Related Art

Most of the current lamp source modules of projectors adopt ultra high pressure mercury lamps, and the ultra high pressure mercury lamps are a type of gas discharge lamps. To avoid light leakage, the lamp source module further includes a light cover covering the lamp base of the lamp source module from the back of the lamp.

Due to the extremely high operating temperature of the ultra high pressure mercury lamp, cooling the burner of the lamp in operation is required to prevent the burner from burning out. As such, the light cover usually has a plurality of ventilation openings formed on the electrodes at the back of the burner for facilitating the in-flow and out-flow of outside cooling air.

However, the bulb of the ultra high pressure mercury lamp under improper use may explode and cause the lamp reflector for reflecting light to break and the broken pieces of the lamp reflector may be spattered outside the light cover through the ventilation openings. Accordingly, in the conventional technology, a metal mesh is disposed on the ventilation openings to prevent the broken pieces of the lamp reflector from being spattered outside. However, such design causes decreased cooling effects and increased part costs.

Patents pertaining to cooling of lamp sources include U.S. Pat. No. 7,510,285 and US publication Nos. US 20070216874 and US 20080100807.

SUMMARY OF THE INVENTION

The invention provides a lamp source module having good shading, explosion prevention, and cooling effects.

The invention provides a projection system having a lamp source module with good shading, explosion prevention, and cooling effects.

The additional objectives and advantages of the invention may be further understood from the technical features disclosed in the descriptions of the invention.

To achieve at least one objective, one embodiment of the invention provides a lamp source module including a holder, a gas discharge lamp, a light cover, a blower duct, and an airflow generator. The holder has an air inlet and an air outlet. The gas discharge lamp has a lamp reflector assembled on the holder and a burner disposed in the lamp reflector. The light cover is assembled on the holder and surrounds the lamp reflector. The blower duct communicates with the air inlet and extends along the exterior of the lamp reflector to the bottom of the lamp reflector. The airflow generator communicates with the blower duct and is capable of providing a cooling airflow. The air inlet is capable of causing the cooling airflow to enter the blower duct. The blower duct is capable of directing the cooling airflow to the bottom of the lamp reflector to make the cooling airflow pass through a sandwiched space surrounded by the lamp reflector and the light cover and then discharge from the air outlet.

To achieve at least one objective, one embodiment of the invention further provides a projection system including the above-mentioned lamp source module, a light valve, and a lens. The lamp source module is capable of providing an illuminating beam. The light valve is disposed in a transmission path of the illuminating beam and is capable of converting the illuminating beam into an image beam. The lens is disposed in a transmission path of the image beam and is capable of projecting the image beam outside the projection system to form an image.

Based on the embodiment of the invention, part of the burner inside the bottom of the lamp reflector is cooled by the cooling airflow directed from the airflow generator to the bottom of the lamp reflector via the blower duct. Therefore, openings for the cooling airflow to enter and exit may not be formed by the light cover so a completely enclosed structure is provided to effectively eliminate light leakage from the lamp reflector and also improve explosion prevention ability.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
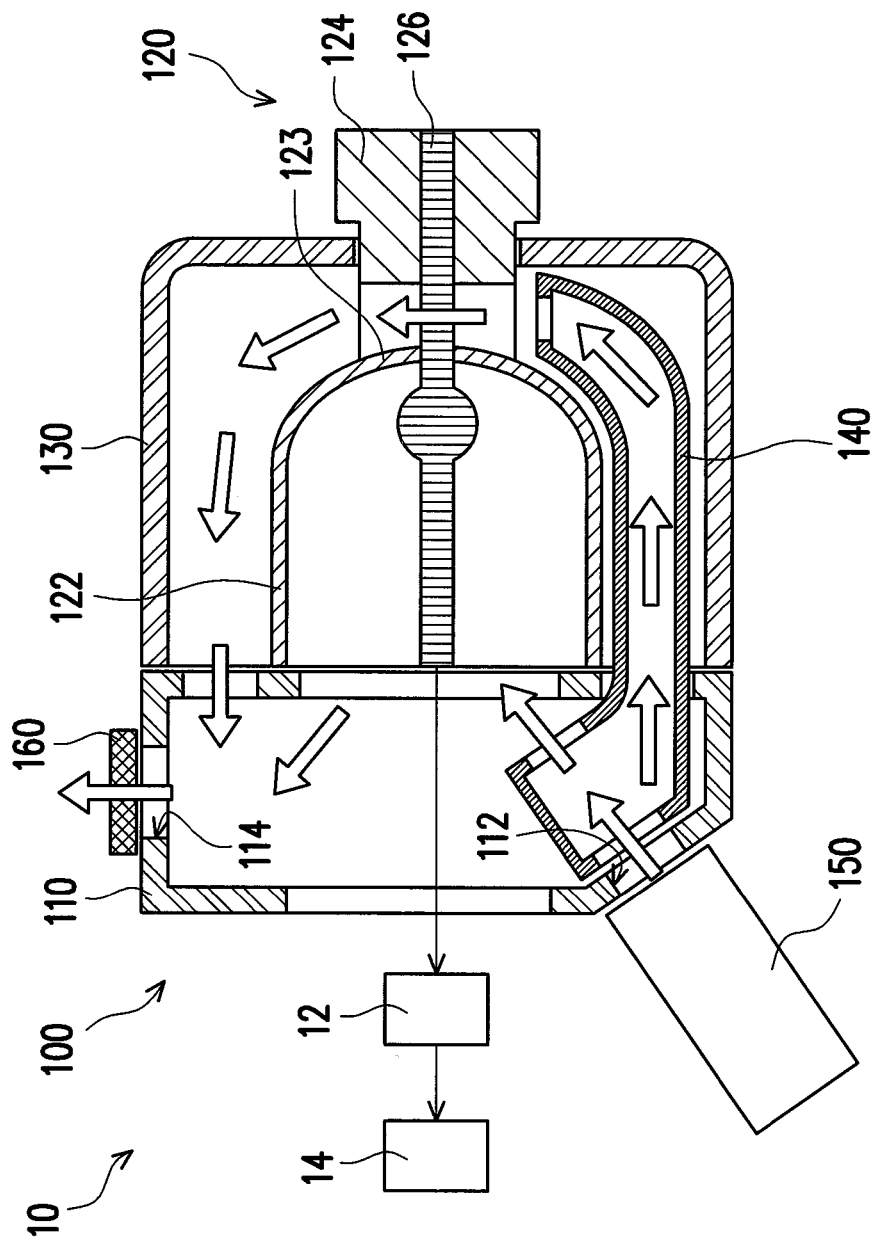
FIG. 1 is a cross-sectional view of a projection system according to an embodiment of the invention.

Referring to FIG. 1, a projection system 10 of the embodiment includes a lamp source module 100, a light valve 12, and a lens 14. The lamp source module 100 is capable of providing an illuminating beam. The light valve 12 is disposed in a transmission path of the illuminating beam and is capable of converting the illuminating beam into an image beam. The lens 14 is disposed in a transmission path of the image beam and is capable of projecting the image beam outside the projection system 10 to form an image.

The lamp source module 100 includes a holder 110, a gas discharge lamp 120, a light cover 130, a blower duct 140, and an airflow generator 150. The holder 110 has an air inlet 112 and an air outlet 114. The gas discharge lamp 120 has a lamp reflector 122 assembled on the holder 110, a lamp base 124 disposed on a bottom 123 of the lamp reflector 122, and a burner 126 disposed in the lamp reflector 122 and the lamp base 124. The light cover 130 is assembled on the holder 110 and surrounds the lamp reflector 122. The blower duct 140 communicates with the air inlet 112 and extends along the exterior of the lamp reflector 122 to the bottom 123 of the lamp reflector 122. The airflow generator 150 communicates with the blower duct 140 and is capable of providing a cooling airflow. In the embodiment, the airflow generator 150 adopts a blower. The air inlet 112 is capable of causing the cooling airflow to enter the blower duct 140. The blower duct 140 is capable of directing the cooling airflow to the bottom 123 of the lamp reflector 122 to make the cooling airflow pass through a sandwiched space surrounded by the lamp reflector 122 and the light cover 130 and then discharge from the air outlet 114.

In the embodiment, the gas discharge lamp 120 may not include the lamp base 124, and the blower duct 140 is capable of directing part of the cooling airflow to inside the lamp reflector 122 to cool the burner 126. In the embodiment, the light cover 130 surrounds the bottom 123 of the lamp reflector 122 and forms a sandwiched space with the lamp reflector 122 and the bottom 123 of the lamp reflector. In another embodiment, the blower duct 140 may directly communicate with the airflow generator 150. In addition, the lamp source module 100 further includes a metal mesh 160 disposed on the air outlet 114 to prevent broken pieces of the lamp reflector 122 from being spattered out of the air outlet 114.

Figure 2:
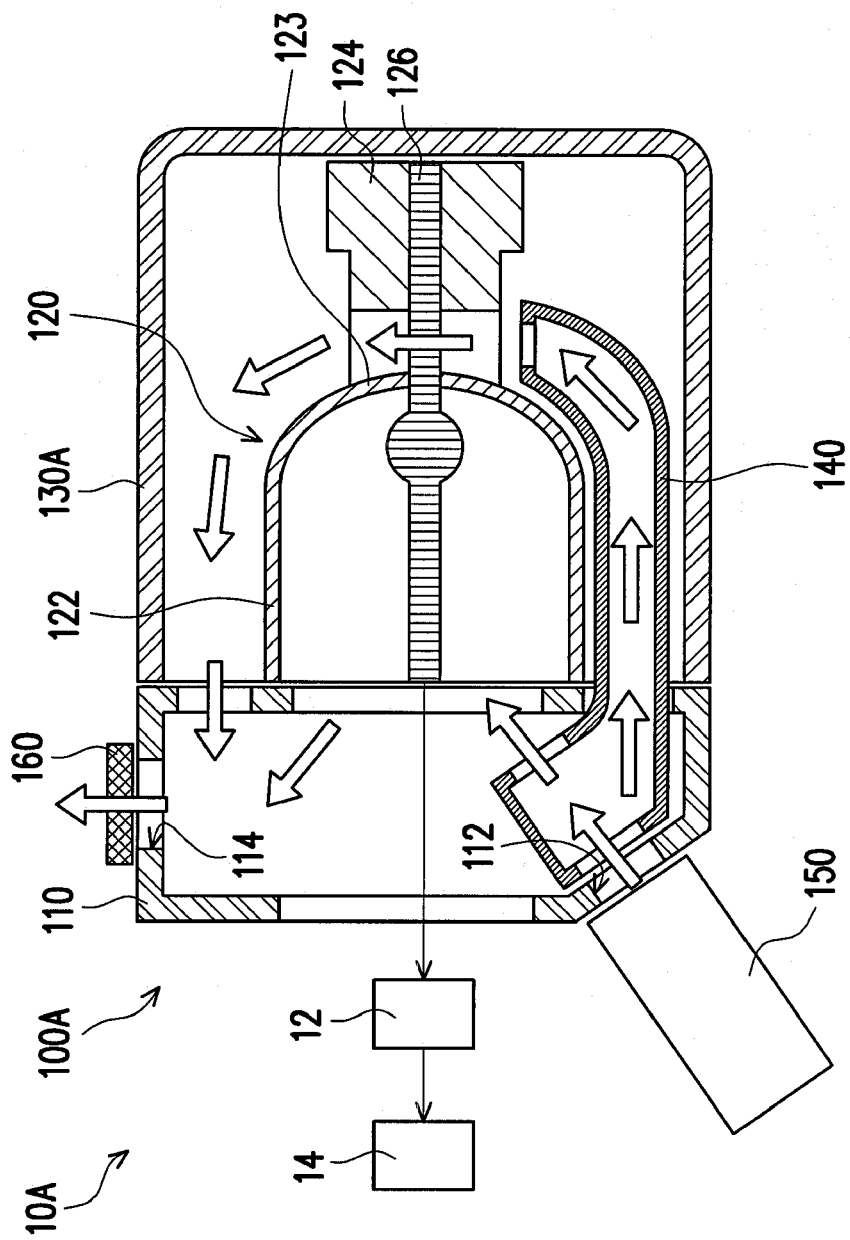
FIG. 2 is a cross-sectional view of a projection system according to another embodiment of the invention.

Referring to FIG. 2, compared to the embodiment of FIG. 1, in a projection system 10A of the embodiment of FIG. 2, a light cover 130A of a lamp source module 100A surrounds a lamp base 124 in addition to a lamp reflector 122. The light cover 130A, the lamp reflector 122, and a lamp base 124 also form a sandwiched space. In the embodiment, a blower duct 140 extends along the exterior of the lamp reflector 122 to the lamp base 124. An air inlet 112 is capable of causing the cooling airflow to enter a blower duct 140. The blower duct 140 is capable of directing the cooling airflow to the lamp base 124 to make the cooling airflow pass through a sandwiched space surrounded by the lamp reflector 122 and the light cover 130 and then discharge from an air outlet 114.

Figure 3:
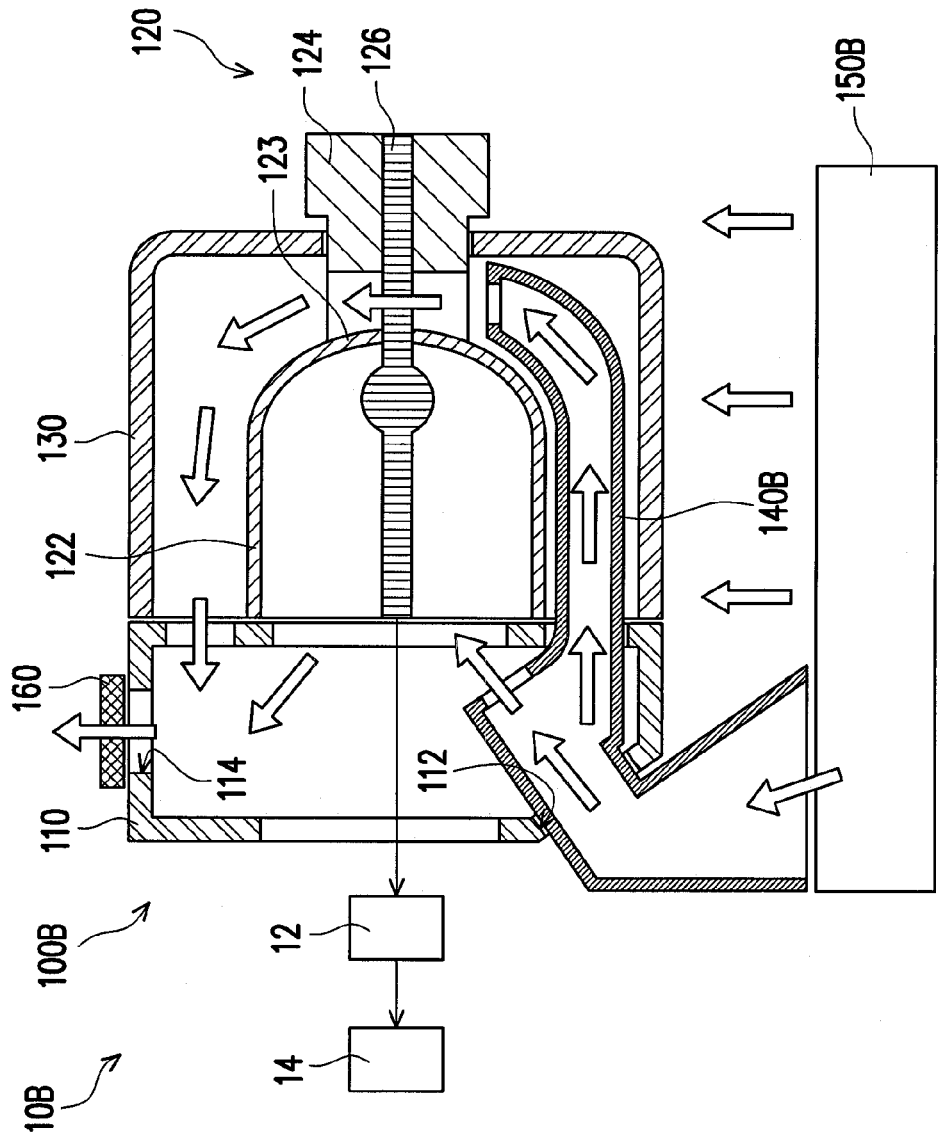
FIG. 3 is a cross-sectional view of a projection system according to another embodiment of the invention.

Referring to FIG. 3, as compared to the embodiment of FIG. 1, in a projection system 10B of the embodiment of FIG. 3, an airflow generator 150B of a lamp source module 100B adopts an axial fan. An air inlet 112 is capable of directing part of a cooling airflow provided by the airflow generator 150B to enter a blower duct 140B. The blower duct 140B is capable of directing part of the cooling airflow into a lamp reflector 122 and to a lamp base 124. Furthermore, part of the cooling airflow blows on a light cover 130.

Figure 4:
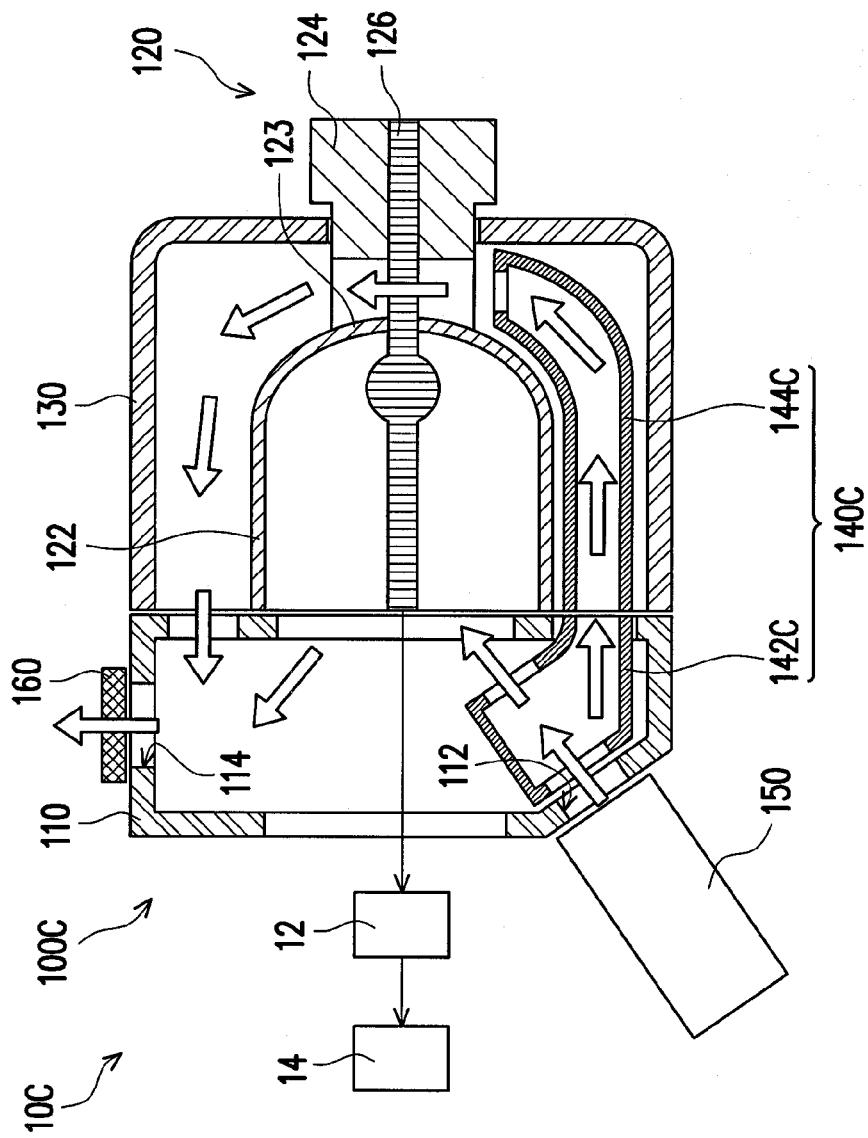
FIG. 4 is a cross-sectional view of a projection system according to another embodiment of the invention.

Referring to FIG. 4, as compared to the embodiment of FIG. 1, in a projection system 10C of the embodiment of FIG. 4, a blower duct 140C of a lamp source module 100C includes a first part 142C and a second part 144C, wherein the first part 142C is capable of dividing and directing a cooling airflow to a lamp reflector 122 and the second part 144C, and the second part 144C is capable of directing the cooling airflow from the first part 142C to a burner 126. In the embodiment, the second part 144C is fastened onto a light cover 130. However, in another embodiment, the second part 144C is integrally formed with the light cover 130 and the integral second part 144C and light cover 130 is a single physical structure.

In summary, in the above embodiment of the invention, part of the burner inside the bottom of the lamp reflector is cooled by the cooling airflow directed from the airflow generator to the bottom of the lamp reflector via the blower duct. Therefore, openings for the cooling airflow to enter and exit may not be formed by the light cover so a completely enclosed structure is provided to effectively eliminate light leakage from the lamp reflector and also improve explosion prevention ability.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention.

It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A lamp source module, comprising:
   a holder having an air inlet and an air outlet;
   a gas discharge lamp having a lamp reflector assembled on the holder and a burner disposed in the lamp reflector;
   a light cover assembled on the holder and surrounding the lamp reflector;
   a blower duct communicating with the air inlet and extending along an exterior of the lamp reflector to a bottom of the lamp reflector; and
   an airflow generator communicating with the blower duct and capable of providing a cooling airflow, wherein the air inlet is capable of causing the cooling airflow to enter the blower duct, and the blower duct is capable of directing the cooling airflow to the bottom of the lamp reflector to make the cooling airflow pass through a sandwiched space surrounded by the lamp reflector and the light cover and then discharge from the air outlet.

2. The lamp source module according to claim 1, wherein the blower duct is capable of directing a part of the cooling airflow into the lamp reflector to cool the burner.

3. The lamp source module according to claim 1, wherein the blower duct directly communicates with the airflow generator.

4. The lamp source module according to claim 1, further comprising a metal mesh covering the out-flow opening.

5. The lamp source module according to claim 1, wherein the light cover further surrounds the bottom of the lamp reflector.

6. The lamp source module according to claim 1, wherein the sandwiched space is surrounded by the light cover, the lamp reflector, and the bottom of the lamp reflector.

7. The lamp source module according to claim 1, wherein the blower duct comprises a first part and a second part, the first part is capable of dividing and directing the cooling airflow to the lamp reflector and the second part, and the second part is capable of directing the cooling airflow from the first part to the burner.

8. The lamp source module according to claim 7, wherein the second part is fastened on the light cover.

9. The lamp source module according to claim 7, wherein the second part and the light cover are integrally formed, and the integrally formed second part and light cover is a single physical structure.

10. The lamp source module according to claim 1, wherein the gas discharge lamp further comprises a lamp base disposed on the bottom of the lamp reflector, the burner is disposed in the lamp reflector and the lamp base, and the blower duct extends along the exterior of the lamp reflector to the lamp base.

11. The lamp source module according to claim 1, wherein the light cover further surrounds the lamp base, and the sandwiched space is surrounded by the light cover, the lamp reflector, and the lamp base.

12. A projection system, comprising:
    a lamp source module capable of providing an illuminating beam, the lamp source module comprising:
      a holder having an air inlet and an air outlet;
      a gas discharge lamp having a lamp reflector assembled on the holder and a burner disposed in the lamp reflector;
      a light cover assembled on the holder and surrounding the lamp reflector;
      a blower duct communicating with the air inlet and extending along an exterior of the lamp reflector to a bottom of the lamp reflector; and
      an airflow generator communicating with the blower duct and capable of providing a cooling airflow, wherein the air inlet is capable of causing the cooling airflow to enter the blower duct, and the blower duct is capable of directing the cooling airflow to the bottom of the lamp reflector to make the cooling airflow pass through a sandwiched space surrounded by the lamp reflector and the light cover and then discharge from the air outlet;
    a light valve capable of converting the illuminating beam into an image beam; and
    a lens disposed in a transmission path of the image beam capable of projecting the image beam outside the projection system to form an image.

13. The projection system according to claim 12, wherein the blower duct is capable of directing a part of the cooling airflow into the lamp reflector to cool the burner.

14. The projection system according to claim 12, wherein the blower duct directly communicates with the airflow generator.

15. The projection system according to claim 12, further comprising a metal mesh covering the air outlet.

16. The projection system according to claim 12, wherein the light cover further surrounds the bottom of the lamp reflector.

17. The projection system according to claim 12, wherein the sandwiched space is surrounded by the light cover, the lamp reflector, and the bottom of the lamp reflector.

18. The projection system according to claim 12, wherein the blower duct comprises a first part and a second part, the first part is capable of dividing and directing the cooling airflow to the lamp reflector and the second part, and the second part is capable of directing the cooling airflow from the first part to the burner.

19. The projection system according to claim 18, wherein the second part is fastened on the light cover.

20. The projection system according to claim 18, wherein the second part and the light cover are integrally formed, and the integrally formed second part and light cover is a single physical structure.

* * * * *